United States Patent [19]

Iwakami et al.

[11] Patent Number: 5,177,649
[45] Date of Patent: Jan. 5, 1993

[54] INFORMATION SIGNAL REORDING APPARATUS FOR RECORDING PILOT SIGNALS ON PARTICULAR AREAS

[75] Inventors: Makoto Iwakami, Sagamihara; Shinichi Yamashita, Yokohama, both of Japan

[73] Assignee: Canon Kabushiki Kaisha, Tokyo, Japan

[21] Appl. No.: 594,956

[22] Filed: Oct. 10, 1990

[30] Foreign Application Priority Data

Oct. 12, 1989 [JP] Japan .................................. 1-263838

[51] Int. Cl.⁵ .............................................. G11B 5/588
[52] U.S. Cl. .................................................. 360/77.14
[58] Field of Search .......................... 360/77.14, 77.15

[56] References Cited

U.S. PATENT DOCUMENTS 4,953,019 8/1990 Skikakura et al. .................. 358/133
4,982,286 1/1991 Iwabuchi et al. ................... 358/160
5,095,394 3/1992 Yanagihara ...................... 360/77.14

Primary Examiner—Joseph L. Dixon
Assistant Examiner—David L. Robertson
Attorney, Agent, or Firm—Fitzpatrick, Cella, Harper & Scinto

[57] ABSTRACT

An information signal recording apparatus, which includes a pilot signal generator for generating a tracking control pilot signal having a predetermined frequency, a generator for generating an information signal to be recorded, and a recorder for recording the pilot signal on a first area of a recording track, and for recording the information signal on a second area of the recording track. A component of the predetermined frequency of the pilot signal is made to be smaller in a leading portion and in an ending portion of the first area than in other portions of the first area.

11 Claims, 9 Drawing Sheets

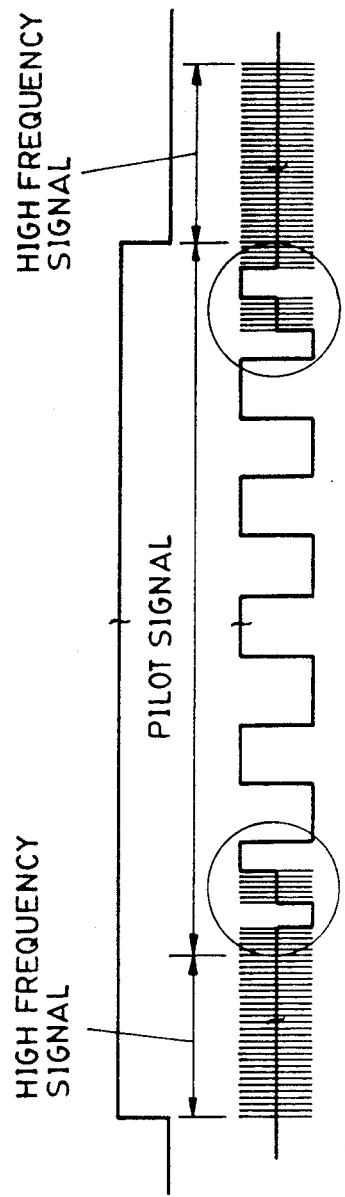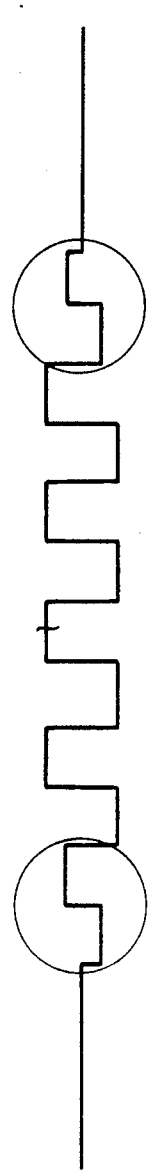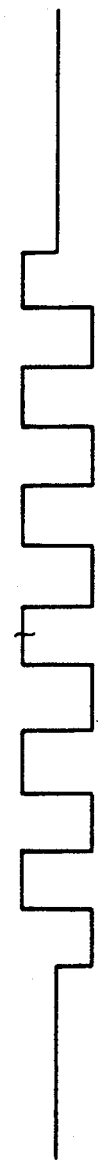
FIG. 9(A) EXAMPLE 1
FIG. 9(B) EXAMPLE 2
FIG. 9(C) CONVENTIONAL PILOT SIGNAL

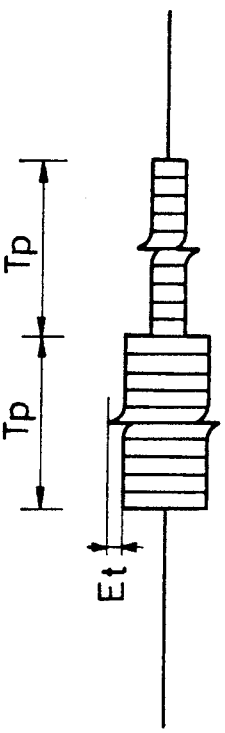
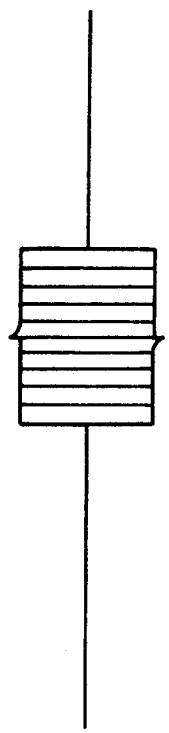
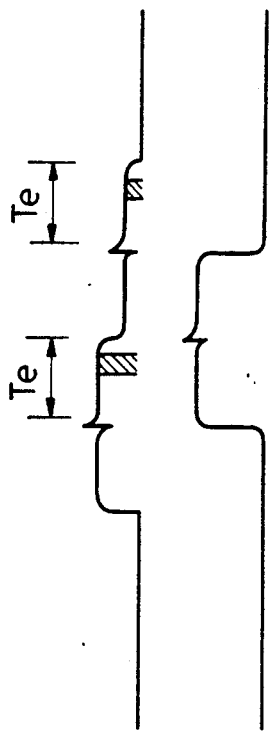
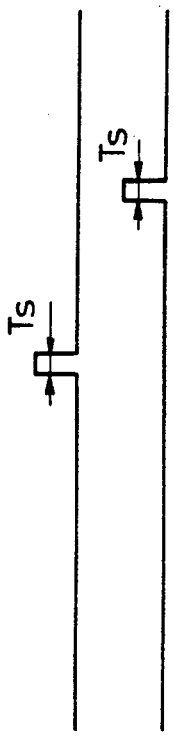
FIG. 10(A) REPRODUCED PILOT SIGNAL A FROM ADJACENT TRACK
FIG. 10(B) REPRODUCE PILOT SIGNAL B FROM HOME TRACK
FIG. 10(C) ENVELOPE OF REPRODUCED PILOT SIGNAL A
FIG. 10(D) ENVELOPE OF REPRODUCED PILOT SIGNAL B
FIG. 10(E) SAMPLE PULSE FOR REPRODUCED PILOT SIGNAL A
FIG. 10(F) SAMPLE PULSE FOR REPRODUCED PILOT SIGNAL B

INFORMATION SIGNAL REORDING APPARATUS FOR RECORDING PILOT SIGNALS ON PARTICULAR AREAS

BACKGROUND OF THE INVENTION

1. Field of the Invention

This invention relates to an information signal recording apparatus, and more particularly, to an information signal recording apparatus for recording pilot signals for tracking control on particular areas of a recording medium.

2. Description of the Related Art

A tracking control method has been known in which a dedicated control head is used and a control signal for tracking control is recorded on a dedicated track, as in VHS-type video cassette recorders.

In this method, that uses a dedicated head and track, a track for recording a main (e.g. image) signal as the target of tracking is different from the dedicated track. Accordingly, when high-density recording is performed, accuracy in tracking cannot be sufficiently increased. Furthermore, there is a restriction in hardware because a dedicated head and track are needed.

In another tracking control method, a pilot signal for tracking control is subjected to being frequency multiplexed with an image signal or the like, serving as a main signal, and the resultant signal is recorded on a main track. When reproducing the signal, crosstalk of the pilot signals from adjacent tracks is subjected to frequency separation to obtain a tracking error signal.

In the method where the pilot signal is subjected to frequency multiplexing with the main signal, a dedicated head and track for tracking are not needed. However, since the pilot signal is subjected to frequency multiplexing, it disturbs the main signal. Accordingly, the recording level of the pilot signal must be lower than that of the main signal. As a result, this method has a disadvantage in that an adequate S/N (signal-to-noise) ratio cannot be obtained in the reproduced pilot signal, and stable tracking control cannot be performed.

In order to solve the disadvantages in the above-described two methods, another tracking control method (termed hereinafter an "area-dividing recording method") has been proposed in which a plurality of pilot signals are recorded on particular areas that are divided from the recording areas for a main signal.

In the area-dividing recording method, pilot signals for tracking control and a main information signal are recorded on areas that are divided from each other but are on an identical track. When reproducing the signals, only the pilot signals are separated and extracted from the signal reproduced by a rotating head. Tape running is controlled and adjusted so that the amounts of crosstalk, of the pilot signals from two adjacent tracks, become equal. Thus, proper tracking is realized.

As an example of the area-dividing recording method, a two-frequency area-dividing recording method for recording two kinds of pilot signals will now be explained by reference to the drawings.

FIG. 1 is a diagram showing a recorded pattern on a tape on which recording areas for two kinds of pilot signals $f_1$ and $f_2$, having different frequencies, and for a PCM signal (such as an image signal, a sound signal or the like, serving as a main information signal) are divided from each other by performing time-division multiplex recording. FIG. 2 is an enlarged diagram showing the neighborhood of the recording areas for the pilot signals $f_1$ and $f_2$.

As shown in FIG. 2, the recording areas for the pilot signals $f_1$ and $f_2$ arranged so that an overlapped portion exists between adjacent tracks. The overlapping areas are very small and are located at the two end portions of the respective tracks. Unrecorded areas on which no signals are recorded are provided before and after each of the recording areas for these pilot signals. The scanning direction of a rotating head H and the direction of tape running are indicated by arrows A and B, respectively.

The pilot signals are produced by recording pulse signals in a burst-like form.

FIG. 3 is a block diagram of a tracking control circuit for making the rotating head H follow the tracks recorded as shown in FIG. 1.

Next, an explanation will be provided of the operation of respective units shown in FIG. 3 by reference to a waveform diagram shown in FIG. 4.

The pilot signal reproduced by the rotating head H is amplified by a head amplifier (not shown), and is then supplied to terminal 70 shown in FIG. 3. The pilot signals $f_1$ and $f_2$ are separated and extracted by band-pass filters 79 and 81 having passbands for the frequencies of the two kinds of pilot signals, respectively (as shown by S79 and S81 in FIG. 4). Subsequently, envelope waveform signals S80 and S82 of the reproduced pilot signals are obtained by detection circuits 80A and 82A, and low-pass filters 80B and 82B, and are supplied to change-over switches 71 and 72, respectively. The change-over switches 71 and 72 are switched at every half rotation of the rotating head H by switching pulses obtained from terminal 99 in synchronization with the rotation of the rotating head H.

In FIG. 3, a pilot signal (for example, $f_1$) on a track (termed hereinafter a "home track"), which the rotating head H principally traces, is subjected to waveform shaping by a clipper circuit 78, and the resultant signal is supplied to a sampling pulse generation circuit 73. On the other hand, pilot signals (for example, $f_2$) obtained as crosstalk from adjacent tracks are supplied to sample-and-hold circuits 75 and 76, where the levels of envelope waveform signals of crosstalk signals from two tracks adjacent to the home track are subjected to sample-and-hold processing with sampling pulses S73 and S74 generated from the sampling pulse generation circuit 73.

A difference between hold levels S75 and S76 becomes a tracking error signal S77, which is supplied to a tracking control circuit 77. The tracking control circuit 77 controls and adjusts tape running so as to minimize the voltage of the tracking error signal, as is well known, to make the tracking of the rotating head H optimum.

In the above-described two-frequency area-dividing recording method, a pilot signal is recorded in a burst-like form on an area joining recording areas on adjacent tracks (see FIG. 2). Therefore, the pilot signal reproduced by the scanning of the rotating head receives noise from adjacent tracks due to transient responses produced at portions where the recording of the pilot signal is started or stopped, as shown in FIGS. 5(A) and 5(B). There is a great influence on a crosstalk signal (a reproduced pilot signal A from tracks adjacent to the home track), which is a very small signal. Hence, the crosstalk method has the disadvantage of a tracking-error voltage that cannot be detected with high accuracy from pilot signals having very small recording areas.

In order to solve the above-described disadvantages, it is possible to expand the recording area for the pilot signal so as to extend the period of time that the crosstalk signal is not influenced by the above-described transient noises. This approach, however, results in reduction of the recording area for the main information signal, causing a disadvantage for high-density recording.

SUMMARY OF THE INVENTION

The present invention has been made in consideration of the above-described background.

It is an object of the present invention to provide an information signal recording apparatus capable of secure tracking control and high-density recording without expanding recording areas for pilot signals.

This object is accomplished, according to one aspect of the present invention, by an information signal recording apparatus comprising (a) pilot signal generation means for generating a pilot signal for tracking control having a predetermined frequency, (b) means for generating an information signal to be recorded, and (c) recording means for recording the pilot signal on a first area of a recording track and for recording the information signal on a second area of the recording track, wherein a component of the predetermined frequency of the pilot signal is smaller in a leading portion and an ending portion of the first area than in the remaining portion of the first area.

According to a further aspect of the present invention, an information signal recording apparatus includes a pilot signal generation circuit for generating a tracking control pilot signal having a predetermined frequency. Circuitry is also provided for generating an information signal to be recorded. Recording circuitry is provided for recording the pilot signal on a first area of a recording track, and for recording the information signal on a second area of the recording track. An amplitude of the pilot signal is arranged to be substantially smaller in a leading portion and in an ending portion of the first area of the recording track than in other portions of the first area.

According to yet another aspect of the present invention, an information signal recording apparatus includes pilot signal generation circuitry for periodically generating a tracking control pilot signal having a predetermined frequency for every predetermined period, a component of the predetermined frequency in the pilot signal being smaller in a leading portion and in an ending portion of the predetermined period than in other portions thereof. Information generation circuitry is provided for generating an information signal to be recorded. Multiplexing circuitry is also provided for time-division multiplexing the pilot signal and the information to form a recording signal. Recording circuitry is provided for recording the recording signal onto a recording medium.

BRIEF DESCRIPTION OF THE DRAWINGS

FIGS. 9A-C are waveform diagrams showing pilot signals recorded by the FIG. 6 apparatus and a conventional pilot signal; and FIGS. 10A-F are diagrams showing reproduced signals from pilot signals recorded by the FIG. 6 apparatus and signals obtained from the reproduced signals.

DETAILED DESCRIPTION OF THE PREFERRED EMBODIMENTS

An embodiment of the present invention will now be explained in detail by reference to the drawings.

Figure 1:
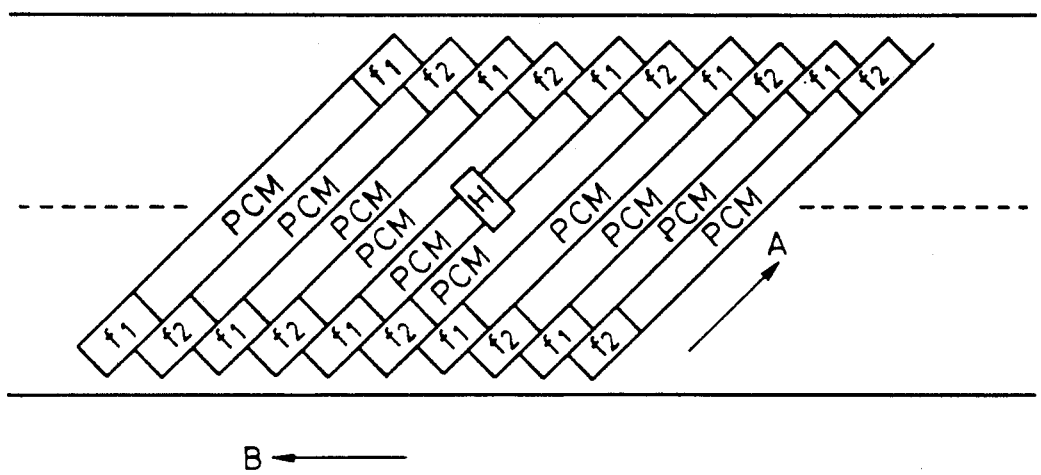
FIG. 1 is a diagram showing a recorded pattern on a tape produced by a two-frequency area-dividing recording method.
Figure 2:
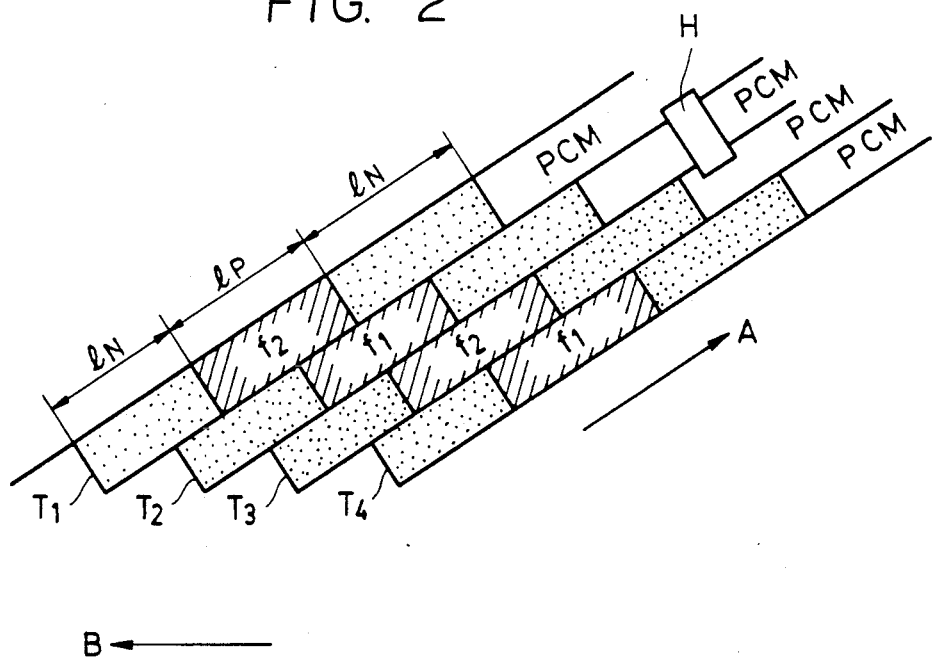
FIG. 2 is an enlarged diagram showing the neighborhood of recording areas for pilot signals shown in FIG. 1.
Figure 6:
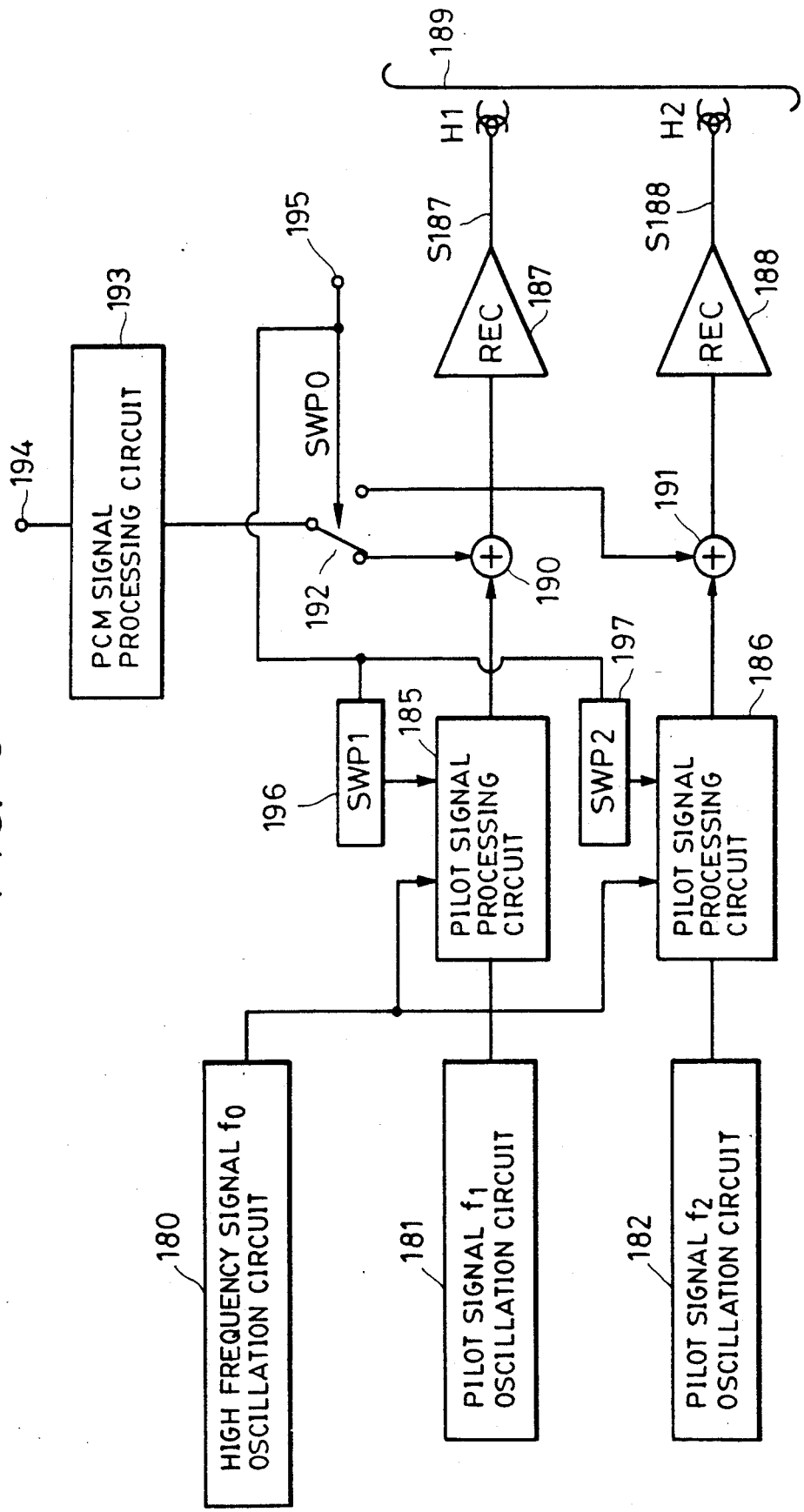
FIG. 6 is a block diagram showing the configuration of a principal part of an information signal recording apparatus according to an embodiment of the present invention.

FIG. 6 is a block diagram of a pilot signal recording system serving as a principal part of a digital data recorder to which the present invention is applied. The recorder according to the present embodiment includes two rotating heads H1 and H2 arranged so as to face each other on a head drum. The recorder also and forms pilot signal recording areas (see FIG. 2) on a magnetic tape 189 according to a two-frequency area-dividing pilot signal recording method.

In FIG. 6, oscillation circuits 181 and 182 output rectangular-wave signals having frequencies of $f_1$ and $f_2$, respectively. An oscillation circuit 180 oscillates a high-frequency signal $f_0$ to be recorded on unrecorded areas (that is, areas for detecting crosstalk from adjacent tracks which correspond to $1_x$ shown in FIG. 2) provided before and after each pilot signal recording area. An SWP1 generation circuit 196 and an SWP2 generation circuit 197 generate pilot signal recording pulses SWP1 and SWP2, respectively. The pilot signal recording pulses SWP1 and SWP2 are formed using head switching pulses SWP0 synchronized with the rotation of the rotating heads H1 and H2. Input terminal 195 is for input of the head switching pulses SWP0.

The two kinds of rectangular-wave signals $f_1$ and $f_2$ generated by the oscillation circuits 181 and 182, and the high-frequency signal $f_0$ are input to pilot signal processing circuits 185 and 186, which output pilot signals unique to the present embodiment (shown in FIG. 9(A)) in synchronization with the pilot signal recording pulses SWP1 and SWP2, respectively.

The pilot signals output from the pilot signal processing circuits 185 and 186 are time-base multiplexed with the main (PCM) signal, and the resultant signals are supplied to the rotating heads H1 and H2 via recording amplifiers REC 187 and 188, respectively.

Figure 7:
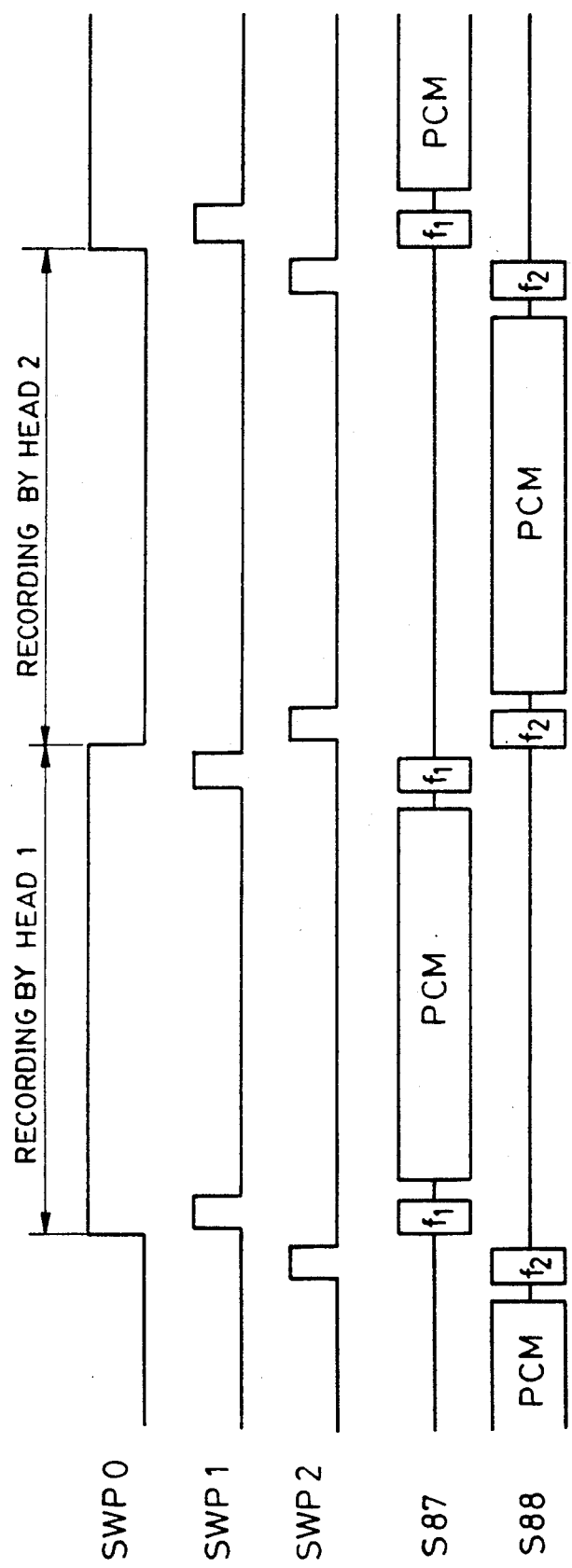
FIG. 7 is a waveform diagram for explaining the operations of respective units shown in FIG. 6.

FIG. 7 is a waveform diagram showing the operation of the system shown in FIG. 6. The above-described head switching pulses SWP0 obtained from rotation detection pulses for the rotating heads H1 and H2 select the heads H1 and H2 for supplying the main information signal, and are also used as a reference for the generation of the pilot signal recording pulses SWP1 and SWP2. That is, the main information signal input from input terminal 194 is subjected to PCM processing, compression and the like by a PCM signal processing circuit 193, and the resultant signal is supplied to a switch 192 as a digital information signal. The switch 192 is controlled by the head switching pulses SWP0.

Timing for the pilot signal recording pulses SWP1 and SWP2 is arranged so as to provide pilot signals at leading and ending portions of each track.

Signals S87 and S88, which are obtained by time serially connecting the pilot signals from the circuits 185 and 186, and the PCM signal output from the switch 192 by multiplexing circuits 190 and 191, respectively, are supplied to the heads H1 and H2 via the recording amplifiers 187 and 188.

Figure 8A:
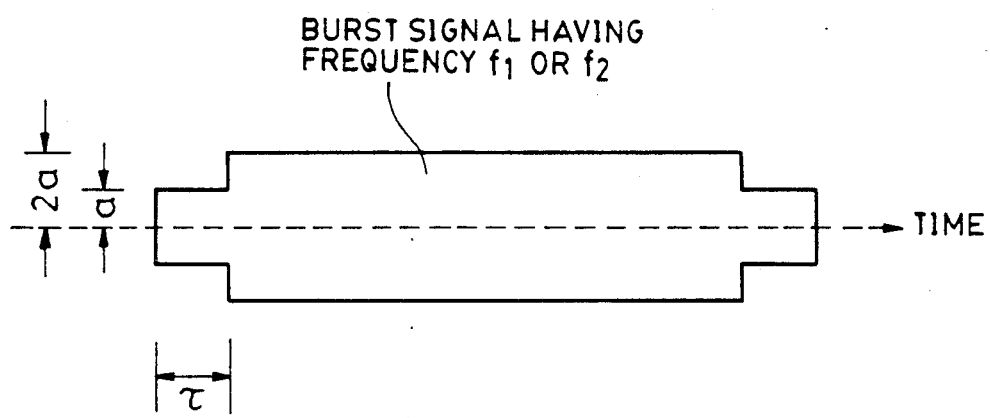
FIGS. 8A-C are diagrams for explaining output signals from a pilot signal processing circuit shown in FIG. 6.

FIG. 8 is a waveform diagram showing a part of the pilot signals output from the pilot signal processing circuits 185 and 186 shown in FIG. 6. The previously known pilot signal is composed of a rectangular signal train intermittent with constant amplitude and frequency for a predetermined time (a so-called burst signal). In the pilot signal of the present embodiment, however, as shown in FIG. 8(A), the amplitude of the pilot signal is substantially "a" for a period $\tau$ from the start of the pilot signal, then becomes substantially "$2a$", and decreases again to substantially "a" at an ending portion of the pilot signal. The frequency of the pilot signal does not change during the entire period. It is to be noted that the substantial magnitude of the amplitude described above indicates the magnitude of energy in the burst frequency $f_1$ or $f_2$ component in the pilot signal.

Figure 8B:
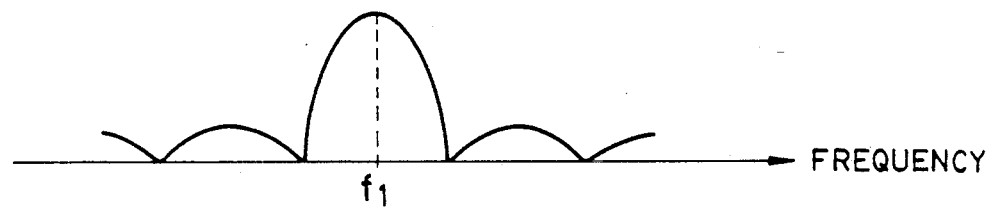
Figure 8C:
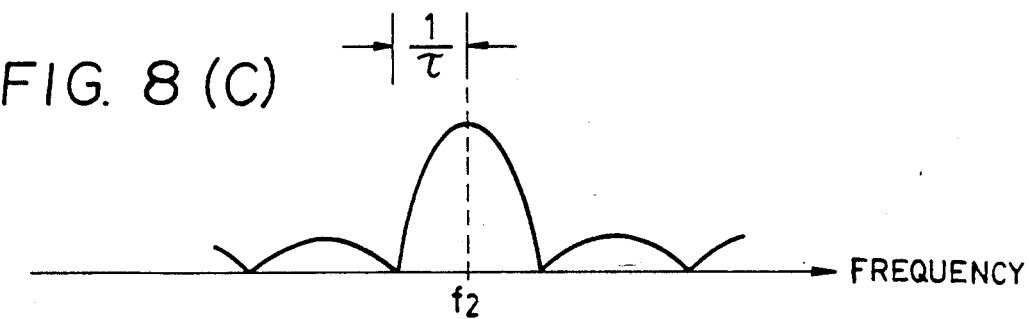

The pilot signal having the burst-like form as shown in FIG. 8(A) is used because the pilot signal has a spectrum as shown in FIG. 8(B) or 8(C) where the frequency of the signal contained in the burst is $f_1$ or $f_2$, respectively.

That is, as for the pilot signal having the burst frequency $f_1$ as shown in FIG. 8(B), in the spectral distribution of the pilot signal having the central frequency $f_1$, the signal's energy decreases as the frequency increases from $f_1$, and the energy increases again as the frequency increases further. If it is assumed that the frequency $f_2$ is separated from the central frequency $f_1$ by $1/\tau$ as shown in FIG. 8(B), the spectral distribution of the pilot signal having the burst frequency $f_2$ is as shown in FIG. 8(C).

As is apparent from the spectral distributions shown in FIGS. 8(B) and 8(C), when crosstalk signals are detected by the rotating heads, spectral components influencing pilot signals on adjacent tracks are sufficiently reduced. Hence, the interference between pilot signals is reduced, and the transient noises (see FIGS. 5(A) and 5(B)) produced in starting and ending portions of the pilot signal recording area become very small.

In FIG. 8(A), for the purpose of simplifying the explanation, it is assumed that there are nonsignal areas before and after the burst signal having the frequency $f_1$ or $f_2$. Actually, however, a high-frequency signal $f_0$ is recorded, as shown in FIG. 9(A). This is because the recording of the high-frequency signal $f_0$, having a frequency sufficiently higher than the frequencies of the pilot signals $f_1$ and $f_2$, can be dealt with as equivalent to recording no signals.

Furthermore, in the embodiment shown in FIG. 9(A), by inserting the high-frequency signal $f_0$ in the amount of half the pulse width of the pilot signal, at portions (within circles) to start recording and to end recording in the pilot signal recorded on a defined length, the amplitude of the pilot signal is equivalently reduced (the energy of the burst frequency is reduced) at the portions to start recording and to end recording. As a result, the same spectral distribution as that of the burst signal shown in FIG. 8(A) is obtained.

The above-described high-frequency signal $f_0$ is not necessarily needed, but a pilot signal as shown in FIG. 9(B) may also be used.

Figure 3:
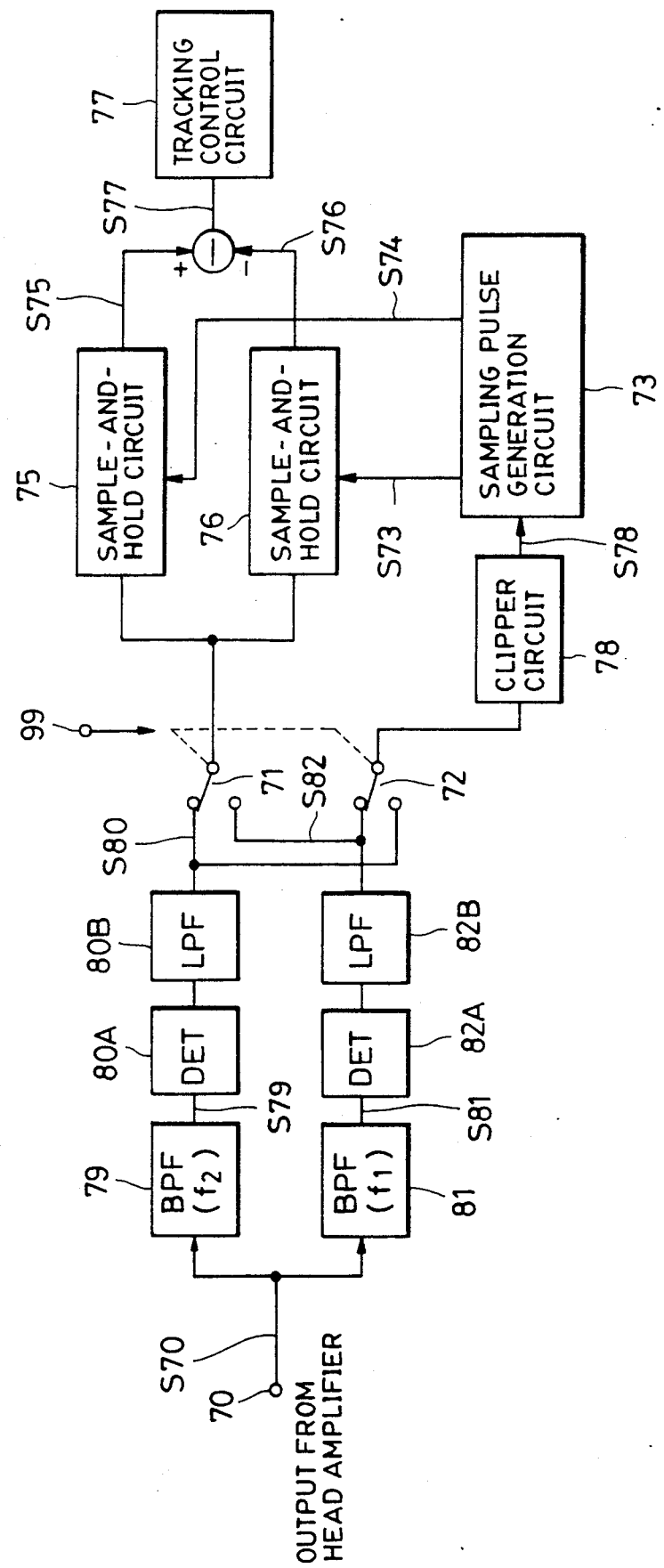
FIG. 3 is a block diagram showing the configuration of a tracking control circuit corresponding to the recorded pattern shown in FIG. 1.
Figure 4:
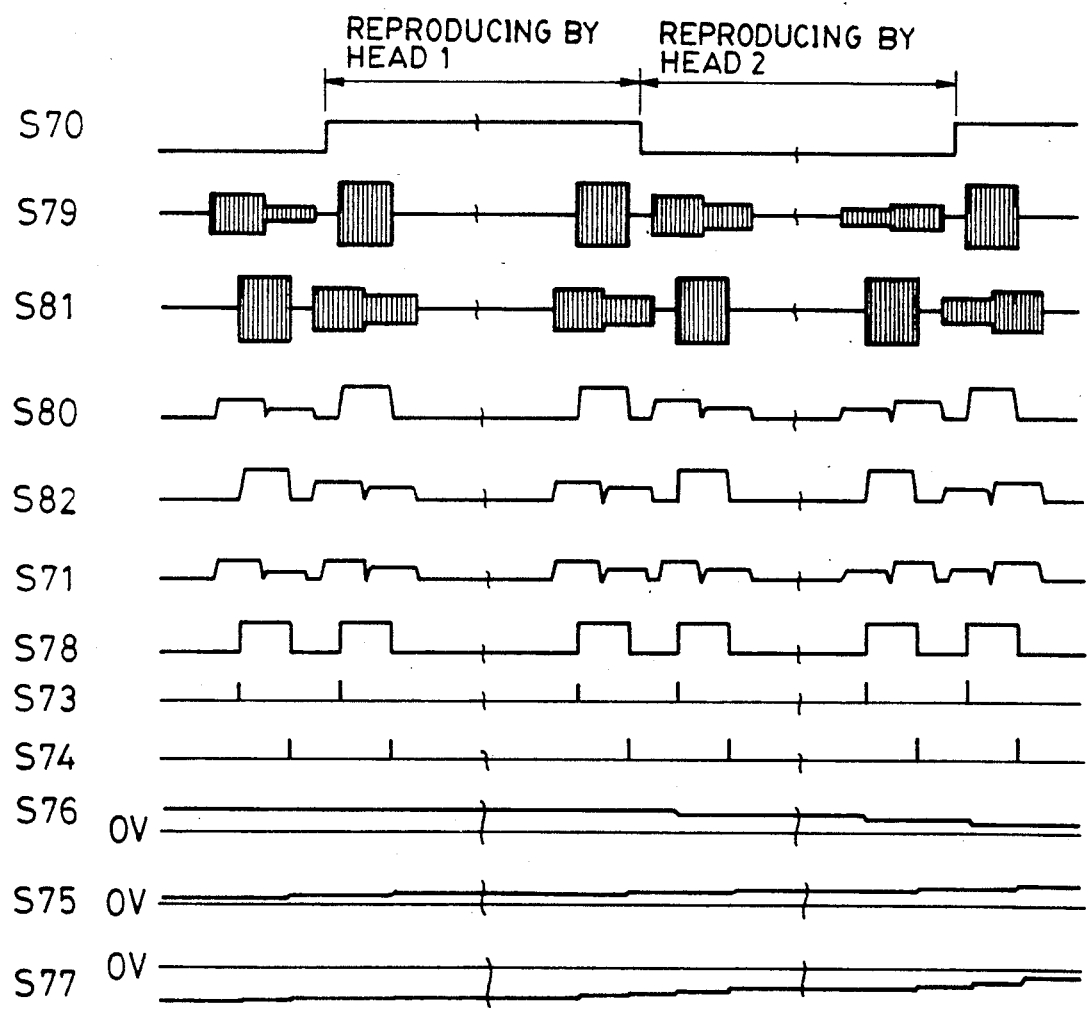
FIG. 4 is a waveform diagram showing waveforms in respective units shown in FIG. 3.

Thus, as shown in FIGS. 10(A) and 10(B), by performing tracking control using the circuit shown in FIG. 3 as well as the pilot signal recorded as described above, the disturbance in the pilot signals reproduced by the rotating heads due to the transient noise becomes very small. FIGS. 10(C) and 10(D) show envelope signals after the reproduced pilot signals have been input to the low-pass filters. That is, FIGS. 10(C) and 10(D) show a crosstalk signal from adjacent tracks and the pilot signal on the home track, respectively. In both signals, transient noise from adjacent tracks is reduced. FIGS. 10(E) and 10(F) show sampling pulses.

Figure 5:
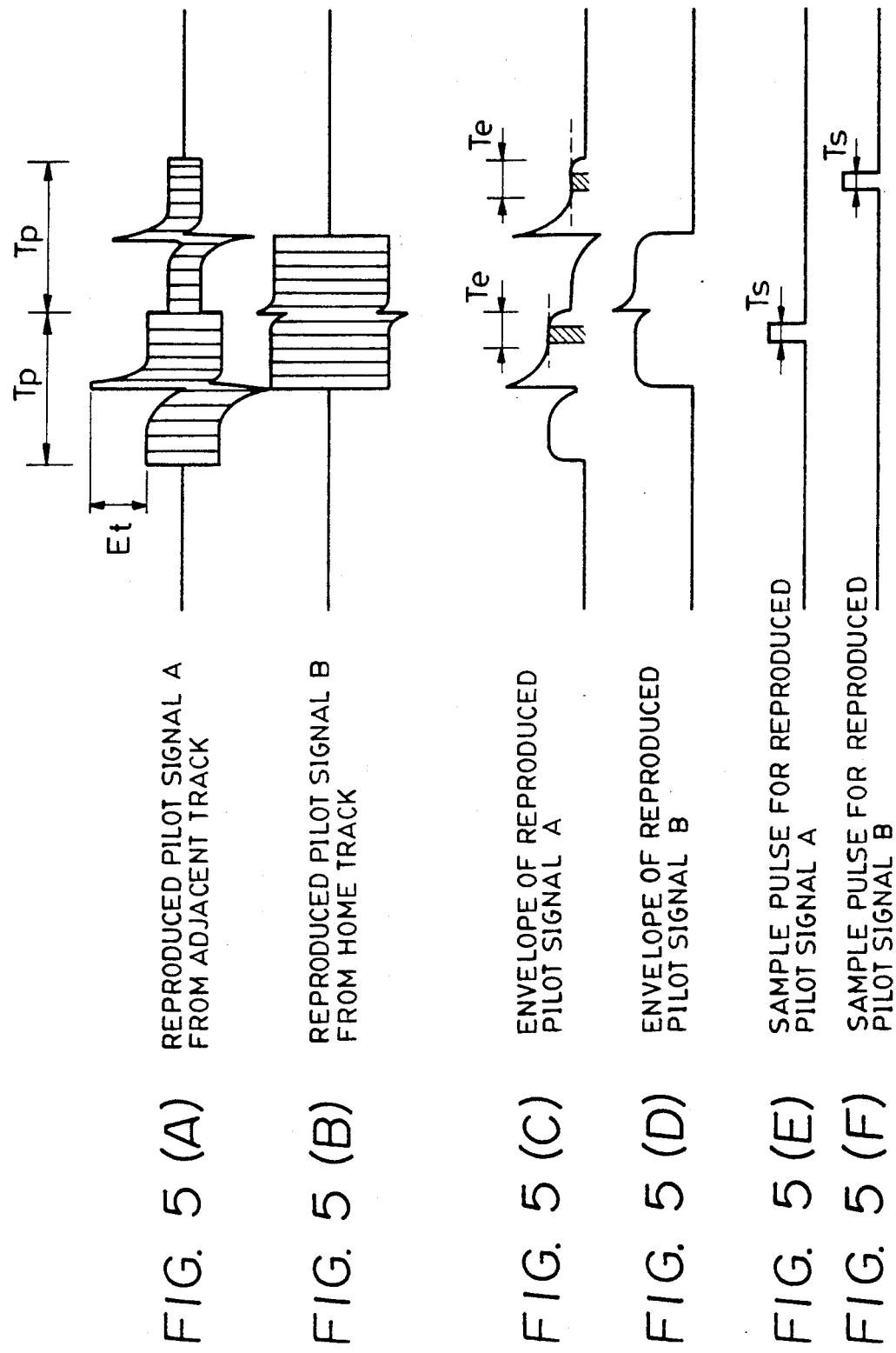
FIGS. 5A-F are waveform diagrams for explaining problems in the circuit shown in FIG. 3.

As shown in FIG. 10(C), since stable portions Te after detection are wide, a recording period Tp for the pilot signals can be shorter than in the prior art (see FIG. 5(C)). Furthermore, as shown in FIGS. 10(E) and 10(F), a width Ts of the sampling pulse can be made wide, and stable sampling becomes possible.

It is possible to use, for example, the known circuit shown in FIG. 3 as the configuration of hardware for reproducing the pilot signals according to the present embodiment. Hence, an explanation thereof will be omitted.

As explained above, according to the present invention, it is possible to perform secure tracking control while suppressing transient response in the pilot signal for tracking control.

The individual components shown in outline or designated by blocks in the Drawings are all well-known in the information signal recording arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information signal recording apparatus, comprising:
   (a) pilot signal generation means for generating a tracking control pilot signal having a predetermined frequency;
   (b) means for generating an information signal to be recorded; and
   (c) recording means for recording the pilot signal on a first area of a recording track, and for recording the information signal on a second area of the recording track, wherein a component of the predetermined frequency of the pilot signal is smaller in a leading portion and in an ending portion of the first area than in other portions of the first area.

2. An apparatus according to claim 1, wherein an amplitude of the pilot signal is smaller in the leading portion and in the ending portion of the first area than in the other portions of the first area.

3. An apparatus according to claim 2, wherein the pilot signal comprises a rectangular-wave signal.

4. An apparatus according to claim 1, further comprising:
   means for generating a high-frequency signal having a frequency higher than the predetermined frequency; and
   multiplexing means for multiplexing the pilot signal and the high-frequency signal, said multiplexing means setting a multiplexing ratio of the high-frequency signal to the pilot signal higher in the leading portion and in the ending portion of the first area than in the other portions of the first area.

5. An apparatus according to claim 4, wherein the pilot signal and the high-frequency signal each comprises a rectangular-wave signal.

6. An apparatus according to claim 1, wherein said pilot signal generation means alternately generates a pilot signal having a first predetermined frequency and a pilot signal having a second predetermined frequency, and wherein said recording means records the pilot signal having the first predetermined frequency on a first area of a first recording track, and records the pilot signal having the second predetermined frequency on a first area of a second recording track adjacent to the first recording track.

7. An apparatus according to claim 1, further comprising:
   reproducing means for reproducing a signal from the recording track; and
   tracking control means for controlling a relative position between said reproducing means and the recording track using the pilot signal reproduced by said reproducing means.

8. An information signal recording apparatus, comprising:

(a) pilot signal generation means for generating a tracking control pilot signal having a predetermined frequency;

(b) means for generating an information signal to be recorded; and (c) recording means for recording the pilot signal on a first area of a recording track, and for recording the information signal on a second area of the recording track, wherein an amplitude of the pilot signal is substantially smaller in a leading portion and in an ending portion of the first area than in other portions of the first area.

9. An apparatus according to claim 8, further comprising:
   means for generating a high-frequency signal having a frequency higher than the predetermined frequency; and
   multiplexing means for multiplexing the pilot signal and the high-frequency signal, said multiplexing means setting a multiplexing ratio of the high-frequency signal to the pilot signal higher in the leading portion and in the ending portion of the first area than in the other portions of the first area.

10. An apparatus according to claim 9, wherein the pilot signal and the high-frequency signal each comprises a rectangular-wave signal.

11. An information signal recording apparatus, comprising:

(a) pilot signal generation means for periodically generating a tracking control pilot signal having a predetermined frequency for every predetermined period, a component of the predetermined frequency in the pilot signal being smaller in a leading portion and in an ending portion of the predetermined period than in other portions thereof;

(b) information generation means for generating an information signal to be recorded;

(c) multiplexing means for time-division multiplexing the pilot signal and the information signal to form a recording signal; and (d) recording means for recording the recording signal on a recording medium.

* * * * *

UNITED STATES PATENT AND TRADEMARK OFFICE
CERTIFICATE OF CORRECTION

PATENT NO. : 5,177,649
DATED : January 5, 1993
INVENTOR(S) : IWAKAMI ET AL.

It is certified that error appears in the above-identified patent and that said Letters Patent is hereby corrected as shown below:

On the title page:

AT [54] TITLE

"REORDING" should read --RECORDING--.

COLUMN 1

Line 1, "REORDING" should read --RECORDING--.

COLUMN 2

Line 4, "arranged" should read --are arranged--.

COLUMN 4

Line 33, "and" should be deleted.

Signed and Sealed this

Eighth Day of June, 1993

Attest:

MICHAEL K. KIRK

Attesting Officer

Acting Commissioner of Patents and Trademarks